United States Patent
Xu et al.

(10) Patent No.: US 11,960,568 B2
(45) Date of Patent: Apr. 16, 2024

(54) MODEL AND METHOD FOR MULTI-SOURCE DOMAIN ADAPTATION BY ALIGNING PARTIAL FEATURES

(71) Applicant: University of Electronic Science and Technology of China, Chengdu (CN)

(72) Inventors: Xing Xu, Chengdu (CN); Yangye Fu, Chengdu (CN); Yang Yang, Chengdu (CN); Jie Shao, Chengdu (CN); Zheng Wang, Chengdu (CN)

(73) Assignee: UNIVERSITY OF ELECTRONIC SCIENCE AND TECHNOLOGY OF CHINA, Chengdu (CN)

(*) Notice: Subject to any disclaimer, the term of this patent is extended or adjusted under 35 U.S.C. 154(b) by 342 days.

(21) Appl. No.: 17/519,604

(22) Filed: Nov. 5, 2021

(65) Prior Publication Data
US 2022/0138495 A1    May 5, 2022

(30) Foreign Application Priority Data
Nov. 5, 2020    (CN) .......................... 202011223578.5

(51) Int. Cl.
| | |
|---|---|
| *G06K 9/62* | (2022.01) |
| *G06F 18/213* | (2023.01) |
| *G06F 18/214* | (2023.01) |
| *G06F 18/241* | (2023.01) |
| *G06N 3/045* | (2023.01) |
| *G06N 3/088* | (2023.01) |

(52) U.S. Cl.
CPC .......... *G06F 18/214* (2023.01); *G06F 18/213* (2023.01); *G06F 18/241* (2023.01); *G06N 3/045* (2023.01); *G06N 3/088* (2013.01)

(58) Field of Classification Search
CPC .... G06F 18/214; G06F 18/213; G06F 18/241; G06F 18/2415; G06N 3/045; G06N 3/088; G06N 3/047; G06N 3/08; G06V 10/454; G06V 10/771; G06V 10/7715; G06V 10/774
See application file for complete search history.

(56) References Cited

PUBLICATIONS

Zhang Yun et al., "Learning Domain-Invariant and Discriminative Features for Homogeneous Unsupervised Domain Adaptation". Chinese Journal of Electronics, pub. Oct. 20, 2020 (Year: 2020).*
Yongchun Zhu et al., "Aligning Domain-Specific Distribution and Classifier for Cross-Domain Classification from Multiple Sources", Third AAAI Conference on Artificial Intelligence, pub. 2019 ( (Year: 2019).*

* cited by examiner

*Primary Examiner* — Mekonen T Bekele
(74) *Attorney, Agent, or Firm* — MATTHIAS SCHOLL P.C.; Matthias Scholl

(57) ABSTRACT

A multi-source domain adaptation model by aligning partial features includes a general feature extraction module, a feature selection module for partial feature extraction with the dedicated loss function, three partial feature alignment losses, and two classifiers for adversarial training, where the three partial feature alignment losses include an intra-class partial feature alignment loss, an inter-domain partial feature alignment loss, and an inter-class partial feature alignment loss. With the partial features extracted by the general feature extraction module and the feature selection module following three different partial feature alignment losses, the model is capable of clustering the samples from the identical categories and isolating samples from distinct classes.

2 Claims, 3 Drawing Sheets

MODEL AND METHOD FOR MULTI-SOURCE DOMAIN ADAPTATION BY ALIGNING PARTIAL FEATURES

CROSS-REFERENCE TO RELATED APPLICATIONS

Pursuant to 35 U.S.C. § 119 and the Paris Convention Treaty, this application claims foreign priority to Chinese Patent Application No. 202011223578.5 filed Nov. 5, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the multi-source domain adaptation branch of computer vision and transfer learning, and more particularly to a multi-source domain adaptation model by high-order moment matching to achieve partial feature alignment, and the designing of partial feature alignment losses on the feature map to make the features discernible for classifiers.

In the field of machine learning, the supervised and semi-supervised approaches utilizing deep neural networks have made great achievements. Relying on multiple open datasets, supervised and semi-supervised learning have been widely applied to tasks including image classification, face recognition, and semantic segmentation. Collecting annotations for the real-world data, nevertheless, requires large amounts of human efforts and thus is impractical. Moreover, due to the presence of domain shift, models trained on other datasets cannot be directly applied to real-world scenarios, which encourages the promotion of unsupervised domain adaptation approaches that do not require labels on the target domain.

Conventional unsupervised domain adaptation methods typically utilize a single source domain as the source of information, and then jointly train the model with labeled source data and unlabeled target samples to achieve domain adaptation by reducing the distribution discrepancy between the source domain data and target domain samples, which allows the model to perform tasks on the target domain. However, the information distilled from merely a single source domain is insufficient to boost the performance on the target domain through unsupervised domain adaptation, and multi-source domain adaptation, which dedicates to transfer knowledge learned from multiple source domains and to align source information with target samples, has been raised as a novel research topic to obtain a better performance gain on the target domain.

Among the current works on multi-source domain adaptation models, cutting-edge techniques from different aspects, such as adversarial training, knowledge transfer and aggregation, source distilling, dynamic dataset selection, feature extraction and alignment, and subspace learning, have been proposed, based on the theory of deep learning and to boost the target performance. As an approach to match the source domains and the target domain on the feature space, feature extraction and alignment has been widely used in multi-source domain adaptation.

Recent multi-source domain adaptation strategies that utilize the technique of feature extraction and alignment typically construct a weight-sharing feature extractor to extract features from multiple source domains and the target domain, and design alignment losses that focus on different dimensions of the feature map to reduce the distribution discrepancy among the source domains and the target domain.

Although the methods proposed by the researchers have reached high accuracies on extensive open datasets, there are some missing pieces in the current feature extraction and alignment methods. For example, some methods use the entire feature maps gained from general feature extractors during the feature alignment procedure, while such features not only contain the attributes that associates with both source domains and the target domain, but also contain some specific features that only present in a particular source domain, which can contribute to performance drop if the unrelated source features are forcefully aligned with the target features.

As mentioned above, in multi-source domain adaptation, based on the assumption that the union set of the source domain features contains all of the target key features, it is necessary to investigate the importance of each feature dimension in performing target tasks and the similarity among the source domains and the target domain on the feature level and to propose a novel alignment strategy that aims to align the partial features that are highly related to the target domain, and thus to achieve better results on the target tasks.

SUMMARY

The disclosure provides a strategy for the partial feature alignment on the feature level of the images using high-order moment distance, aiming to investigate the highly related features among multiple source domains and the target domain and to apply partial feature alignment losses on the feature map from three different aspects, which can contribute to better classification performance.

The disclosure provides a multi-source domain adaptation model by aligning partial features comprising a general feature extraction module, a feature selection module for partial feature extraction with the dedicated loss function, three partial feature alignment losses, and two classifiers for adversarial training, where the three partial feature alignment losses comprise an intra-class partial feature alignment loss, an inter-domain partial feature alignment loss, and an inter-class partial feature alignment loss. With the partial features extracted by the general feature extraction module and the feature selection module following three different partial feature alignment losses, the model is capable of clustering the samples from the identical categories and isolating samples from distinct classes.

The general feature extraction module is configured to acquire raw feature maps through conventional convolutional neural networks (CNN) and residual neural networks ResNet-101; the raw feature maps are an output of the general feature extraction module for simple and complicated images. $L_1$ distances between the raw feature maps of different pairs of the source domain and target domain are used as inputs of the feature selection module for partial feature extraction.

The convolutional neural networks comprise three convolutional layers and two fully connected layers, and a dimension of a last layer of the networks is 2048; the residual neural networks utilize ResNet-101, with a last classification layer removed, to obtain feature maps of 2048 output dimensions of the residual neural networks.

The feature selection module for partial feature extraction is built with two fully connected layers and utilizes the $L_1$ distances as an input to analyze highly-related feature dimensions between source domains and target domains; an output of the feature selection module is a feature selection vector for an original feature map, which is applied to the original feature map to conduct a refined feature map through dot product.

Further, on the refined feature map, a loss function of the feature selection module for partial feature extraction, the intra-class partial feature alignment loss, the inter-domain partial feature alignment loss, and the inter-class partial feature alignment loss are calculated, respectively, and a weighted combination of the loss functions and a classification loss is used as an overall loss function.

The loss function of the feature selection module for partial feature extraction is:

$$L_p = \frac{1}{N_S}\sum_{k=1}^{N_S}\left\|\mathbb{E}(F_{S_i}^k)-\mathbb{E}(F_T^k)\right\|_2 + \binom{N_S}{2}^{-1}\sum_{i=1}^{N_S-1}\sum_{j=i+1}^{N_S}\left\|\mathbb{E}(F_{S_i}^k)-\mathbb{E}(F_{S_j}^k)\right\|_2 + \lambda_{reg}\sum(1-\overline{v})^2,$$

where $F_{S_i}=G(\mathcal{D}_{S_i})\cdot v_i$ and $F_T=G(\mathcal{D}_T)\cdot \overline{v}$ represent the refined features of the source domains and the target domain, respectively, and k is the order of the high-order moment distance; $\lambda_{reg}$ is the weight parameter for regularization; $N_S$ is the number of domains;

$$\binom{N_S}{2}=\frac{N_S(N_S-1)}{2}$$

is the combinatorial number, and $$\binom{N_S}{2}^{-1}$$

is it's reciprocal. $v_i$ stands for the feature selection vector for source domain i; $\overline{v}$ is the average over the feature selection vectors of each source domain; $\mathcal{D}_{S_i}$ represents a batch of sample from source domain i, and $\mathcal{D}_T$ represents a batch of sample from the target domain; $\mathbb{E}(*)$ is an abbreviation of the expected value; G stands for the general feature extractor; $G(\mathcal{D}_{S_i})$ is the raw feature map extracted from source domain i, and $G(\mathcal{D}_T)$ is the raw feature map extracted from the target domain.

The three partial alignment loss functions are calculated on top of the class centroids on the refined feature map, which is defined as follows:

$$f_{i_c}=\frac{1}{n_c}\sum F_{S_{i_c}},$$

where $f_{i_c}$ represents the centroid of class c in the source domain i;

$$F_{S_{i_c}}$$

stands for the refined features of samples that belong to class c from source domain i, and $n_c$ represents the number of samples in a training batch.

Similarly, the class centroid of the target domain is defined as follows:

$$f_{T_c}=\frac{1}{n_c}\sum F_{T_c},$$

where $f_{T_c}$ represents the centroid of class c in the target domain; $F_{T_c}$ stands for the refined features of samples that belong to class c from the target domain, and $n_c$ represents the number of samples in a training batch.

To preserve the information gained from previous training batches of the multi-source domain adaptation model by aligning partial features, the exponential moving average is utilized to update all of the centroids during each batch:

$$f_{i_c}^b=\beta_c f_{i_c}^{b-1}+(1-\beta_c)\frac{1}{n_c}\sum F_{S_{i_c}}^b,$$

where $\beta_c$ is the weight parameter for previously calculated centroids; $f_{i_c}^b$ and $$F_{S_{i_c}}^b$$

represent the maintained centroid and refined features of class c in the source domain i during batch b, respectively; the calculations of the target centroids $f_{T_c}^b$ are the same as above.

The intra-class partial feature alignment loss is:

$$L_c=\sum_i\sum_c\left\|\mathbb{E}((F_{i_c}^b)^k)-\mathbb{E}((F_{S_{i_c}}^b)^k)\right\|+\sum_c\left\|\mathbb{E}((F_{T_c}^b)^k)-\mathbb{E}((F_{T_c}^b)^k)\right\|;$$

where k stands for the order of high-order moment.

The inter-domain partial feature alignment loss is:

$$L_{dom}=\sum_i\sum_c(f_{T_c}^b-f_{i_c}^b)^2,$$

where $f_{T_c}^b$ and $f_{i_c}^b$ respectively represent the above-mentioned centroids of class c of the target domain and the source domain i; the loss adds a constraint of Euclidean distance to regularize that the class centroids of different source domains should be mapped close to the dedicated target domain centroids;

The inter-class partial feature alignment loss is:

$$L_{disc}=\sum_i\sum_j\left(B-\left\|f_{T_i}^b-f_{T_j}^b\right\|\right)^2,$$

where $f_{T_i}^b$ and $f_{T_j}^b$ represent the centroids of class i and class j of the target domain, respectively; B is a bias hyper-parameter set for restricting the degree of discreteness of different class centroids on the feature map of the target domain.

The overall loss function for the multi-source domain adaptation model by aligning partial features is:

$$L=L_s+\lambda_p L_p+\lambda_c L_c+\lambda_{dom}L_{dom}+\lambda_{disc}L_{disc},$$

where $L_s$ is the classification cross-entropy loss for source domains, which is the sum of the cross-entropy losses of the two classifiers; $\lambda_p$, $\lambda_c$, $\lambda_{dom}$, $\lambda_{disc}$ are weight parameters for $L_p$, $L_c$, $L_{dom}$, $L_{disc}$, respectively.

The disclosure also provides a method for multi-source domain adaptation by aligning partial features, the method comprising the following steps:

Step 1: Preprocessing the data;

Step 2: Extracting raw features from the processed data using the general feature extraction module;

Step 3: Calculating partial feature alignment losses and selecting partial features from raw features; calculating the absolute discrepancy between the source domain features and the target domain features and inputting the results to the feature selection module for partial feature extraction to derive the feature selection vector that is applied to the raw feature map to construct the refined features; calculating the loss function L on the refined feature map and updating the parameters of each module;

Step 4: Training the general feature extraction module and the two classifiers in an adversarial manner; repeating Step 2 and Step 3 to obtain the refined feature map and the prediction probabilities of the two classifiers, and computing the sum of the classification cross-entropy loss $L_s$ of the classifiers as well as the absolute distance $L_{dis}$ between the prediction probabilities of the two classifiers on the target domain; updating the classifiers with $L_s-L_{dis}$ while fixing the parameters of other modules, and then updating the general feature extraction module with the absolute distance between classification probabilities;

Step 5: Predicting on the validation set. As the training loss converges, use the general feature extractor and the classifier to conduct the predictions on the validation set to verify the effectiveness of the model.

Comparing with current techniques, the advantages and the beneficial effects of the disclosure is as the following:

(1) The disclosure proposes a partial feature extraction and selection schema that is suitable for feature refinement. On top of the general feature extraction module, the strategy can derive highly related features among the source domains and the target domain while filtering out the non-related or weakly related features among the source domains and the target domain, which avoids the negative effects of non-related features during feature alignment.

(2) On the refined features, the disclosure focuses on the intra-class feature alignment problem and proposes an intra-class partial feature alignment loss to cluster the samples from the source domains and the target domain that belong to an identical category on the refined feature map, which improves the classification accuracies.

(3) On the aspect of domain adaptation, the disclosure investigates the similarity among images from different domains and designs an inter-domain partial feature alignment loss to associate the class centroids of the source domains and the target domain to reduce the distribution discrepancy among the domains and to accomplish domain adaptation, which makes it possible to transfer the knowledge learned from the source domains to the target domain.

(4) Focusing on the discernibility of different categories on the refined feature map, the disclosure provides an inter-class partial feature alignment loss to isolate the samples that belong to different categories on the target domain, which results in multiple data clusters on the refined feature map that represent different classes, making the data points discernible for the classifiers.

DETAILED DESCRIPTION

To make the purpose, technical scheme, and advantages of the disclosure clearer, and to help the technicians in the related fields better understand the disclosure, the following is a further detailed description of the disclosure. It should be noted that the instances described in the following are a part of embodiments, not all embodiments, of the disclosure, and do not intend to limit the scope of the disclosure. All other embodiments implemented by the technicians in the field without creative work shall fall within the protection scope of the disclosure.

Considering that the existing multi-source domain adaptation models typically align all the features during the feature extraction and alignment procedure, neglecting the fact that some features are unique to the source domain and do not present in the target domain. The disclosure proposes a model and method for multi-source domain adaptation by aligning partial features, which filters the features of the source domains and the target domain at the feature level of the image, so that the remained features are highly associated with the target tasks, and provides three partial feature alignment losses focusing on three different aspects, improving the image classification accuracy on the target domain. The following is a detailed and complete description of the present disclosure in combination with specific examples.

Figure 2:
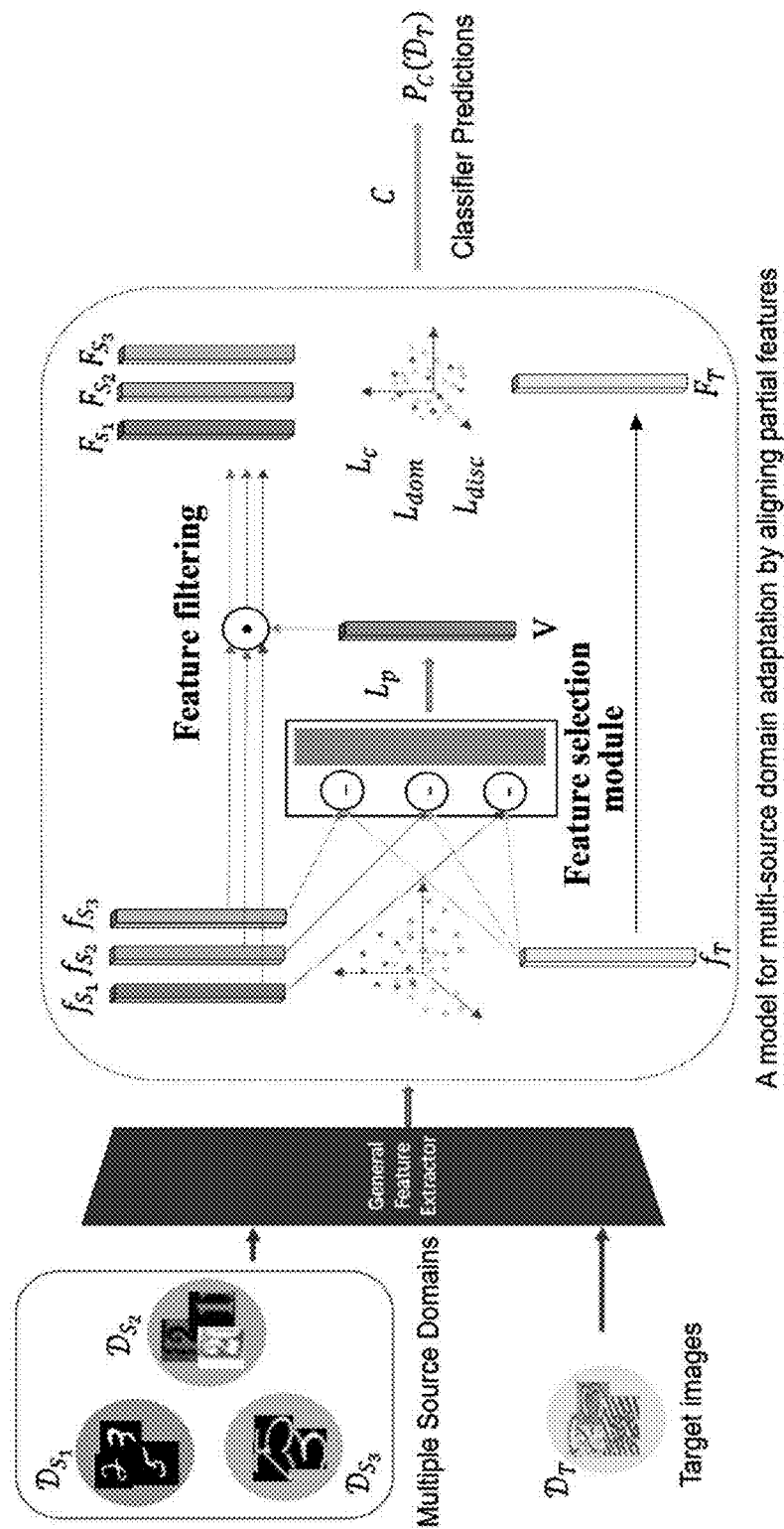
FIG. 2 is a schematic diagram of the partial feature extraction framework in the disclosure.

As shown in FIG. 2, the multi-source domain adaptation model by aligning partial features in the disclosure comprises a general feature extraction module, a feature selection module for partial feature extraction with the dedicated loss function, three partial feature alignment loss functions, and two classifiers for adversarial training, where the three partial feature alignment losses are the intra-class partial feature alignment loss, the inter-domain partial feature alignment loss, and the inter-class partial feature alignment loss.

The general feature extraction module utilizes conventional convolutional neural networks (CNN) and residual neural networks to obtain the raw feature maps for simple and complicated images, respectively. $L_1$ distances between the raw feature maps of different pairs of the source domain and target domain are then used as the inputs of the feature selection module for partial feature extraction; the convolutional neural networks comprise three convolutional layers and two fully connected layers, and the dimension of the last layer of the network is 2048; the residual neural networks utilize ResNet-101, with the last classification layer removed, to derive feature maps of 2048 dimensions.

The feature selection module for partial feature selection is built with two fully connected layers and utilizes the formerly mentioned $L_1$ distance as the input, to analyze the highly related feature dimensions between source and target domains according to the distance; the output of the feature selection module is the feature selection vector for the original feature map, which is applied to the original feature map to conduct the refined feature map through dot product.

On the refined feature map, the loss function of the feature selection module for partial feature extraction, the intra-class partial feature alignment loss, the inter-domain partial feature alignment loss, and the inter-class partial feature alignment loss are calculated, respectively, and the weighted combination of the loss functions and a classification loss is used as the overall loss function.

The loss function of the feature selection module for partial feature extraction is:

$$L_p = \frac{1}{N_S} \sum_{i=1}^{N_S} \left\| \mathbb{E}(F_{S_i}^k) - \mathbb{E}(F_T^k) \right\|_2 + \binom{N_S}{2}^{-1} \sum_{i=1}^{N_S-1} \sum_{j=i+1}^{N_S} \left\| \mathbb{E}(F_{S_i}^k) - \mathbb{E}(F_{S_j}^k) \right\|_2 + \lambda_{reg} \sum (1-\bar{v})^2,$$

where $F_{S_i} = G(\mathcal{D}_{S_i}) \cdot v_1$ and $F_T = G(\mathcal{D}_T) \cdot \bar{v}$ represent the refined features of the source domains and the target domain, respectively, and k is the order of the high-order moment distance; $\lambda_{reg}$ is the weight parameter for regularization; $N_S$ is the number of domains;

$$\binom{N_S}{2} = \frac{N_S(N_S-1)}{2}$$

is the combinatorial number, and $$\binom{N_S}{2}^{-1}$$

is it's reciprocal. $v_i$ stands for the feature selection vector for source domain i; $\bar{v}$ is the average vector over the feature selection vectors of each source domain; $\mathcal{D}_{S_i}$ represents a batch of sample from source domain i, and $\mathcal{D}_T$ represents a batch of sample from the target domain; $\mathbb{E}(*)$ is an abbreviation of the expected value; G stands for the general feature extractor; $G(\mathcal{D}_{S_i})$ is the raw feature map extracted from source domain i, and $G(\mathcal{D}_T)$ is the raw feature map extracted from the target domain.

The three partial alignment loss functions are calculated on top of the class centroids on the refined feature map, which is defined as follows:

$$f_{i_c} = \frac{1}{n_c} \sum F_{S_{i_c}},$$

where $f_{i_c}$ represents the centroid of class c in the source domain i;

$$F_{S_{i_c}}$$

stands for the refined features of samples that belong to class c from source domain i, and $n_c$ represents the number of samples in a training batch.

Similarly, the class centroid of the target domain is defined as follows:

$$f_{T_c} = \frac{1}{n_c} \sum F_{T_c},$$

where $f_{T_c}$ represents the centroid of class c in the target domain; $F_{T_c}$ stands for the refined features of samples that belong to class c from the target domain, and $n_c$ represents the number of samples in a training batch.

To preserve the information gained from previous training batches of the multi-source domain adaptation model by aligning partial features, the exponential moving average is utilized to update all of the centroids during each batch:

$$f_{i_c}^b = \beta_c f_{i_c}^{b-1} + (1-\beta_c) \frac{1}{n_c} \sum F_{S_{i_c}}^b,$$

where $\beta_c$ is the weight parameter for previously calculated centroids; $f_{i_c}^b$ and $$F_{S_{i_c}}^b$$

represent the maintained centroid and refined features of class c in the source domain i during batch b, respectively; the calculations of the target centroids $f_{T_c}^b$ are the same as above.

Figure 3:
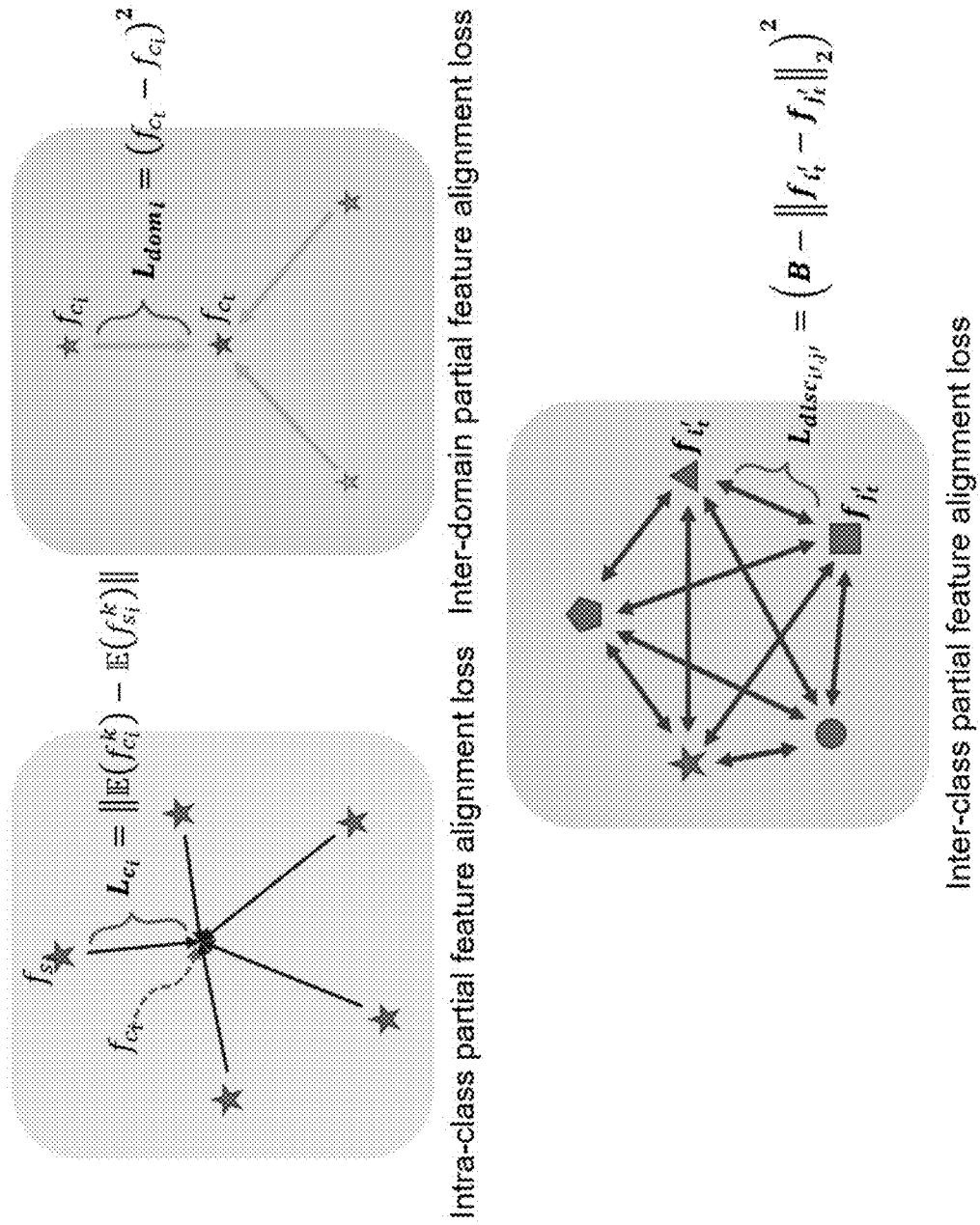
FIG. 3 is a schematic diagram for the three partial feature alignment loss functions.

As shown in FIG. 3, the intra-class partial feature alignment loss is:

$$L_c = \sum_i \sum_c \left\| \mathbb{E}((F_{i_c}^b)^k) - \mathbb{E}((F_{S_{i_c}}^b)^k) \right\| + \sum_c \left\| \mathbb{E}((F_{T_c}^b)^k) - \mathbb{E}((F_{T_c}^b)^k) \right\|;$$

where k stands for the order of high-order moment.

The inter-domain partial feature alignment loss is:

$$L_{dom} = \sum_i \sum_c (f_{T_c}^b - f_{i_c}^b)^2,$$

where $f_{T_c}^b$ and $f_{i_c}^b$ represent the above-mentioned centroids of class c of the target domain and the source domain i, respectively.

The inter-class partial feature alignment loss is:

$$L_{disc} = \sum_i \sum_j \left( B - \left\| f_{T_i}^b - f_{T_j}^b \right\| \right)^2,$$

where $f_{T_i}^b$ and $f_{T_j}^b$ represent the centroids of class i and class j of the target domain, respectively; B is a bias hyper-parameter set for restricting the degree of discreteness of different class centroids on the feature map of the target domain.

The overall loss function for the multi-source domain adaptation model by aligning partial features is:

$$L = L_s + \lambda_p L_p + \lambda_c L_c - \lambda_{dom} L_{dom} + \lambda_{disc} L_{disc},$$

where $L_s$ is the classification cross-entropy loss for source domains, which is the sum of the cross-entropy losses of two classifiers during adversarial training; $L_c$, $\lambda_{dom}$, $\lambda_{disc}$ are pre-defined weight parameters for $L_p$, $L_c$, $L_{dom}$, $L_{disc}$, respectively.

Figure 1:
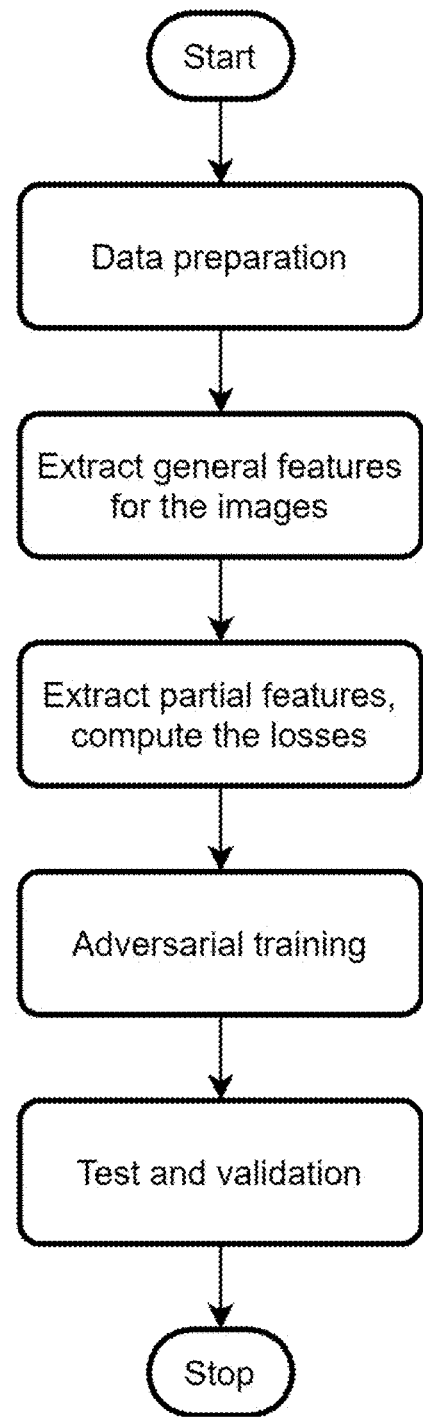
FIG. 1 is a flow chart of the partial feature alignment procedure of the disclosure.

As shown in FIG. 1, the method for multi-source domain adaptation by aligning partial features in the disclosure comprises the following steps:

Step 1: Preprocessing the data. Three open datasets are utilized for experiments in this embodiment example, including Digit-Five, Office-31, and DomainNet.

Digit-Five collects the subsets of five different types of hand-written digit classification datasets, which are MNISTM-M, MNIST, USPS, SVHN, and Synthetic Digits, where USPS contains 9298 images and other datasets each contains 25000 images for training and 9000 images for validation.

Office-31 is a conventional multi-source domain adaptation dataset comprising 4652 images in 31 different categories that are collected from the office environment and are presented in three domains: Amazon, Webcam, and DSLR;

DomainNet was proposed in recent years and is by far the largest and the most challenging dataset for multi-source domain adaptation that contains six domains of data: clipart, infograph, painting, quickdraw, real, and sketch, and each domain contains 345 categories of images.

The three datasets are selected to verify the robustness of the model on different scales. As the number of categories and the domain gap increases from Digit-Five and Office-31 to DomainNet, the task becomes more and more challenging for the model, so that the model's performance can be effectively evaluated from different levels through this dataset setting. The data preparation process includes image resizing, random clip, and random crop;

Step 2: Extracting raw features from the processed data using the general feature extraction module.

For the Digit-Five dataset, the images are resized to 32×32, and the general feature extraction module is constructed with three convolutional layers and two fully-connected layers, where the convolution kernel size is 5 and the output of the fully-connected layers is a feature vector with 2048 dimensions; for Office-31 dataset, the images are resized to 252×252, and the general feature extraction module is AlexNet pre-trained on ImageNet, whose output is a feature vector with 4096 dimensions; for DomainNet dataset, the image size is 224×224 and the pre-trained ResNet-101 is utilized as the general feature extractor, which outputs a 2048-dimension feature vector; we use $f_{S_i}$ and $f_T$ to represent the feature map of the source domain i and that of the target domain, respectively.

During training, the batch size of Digit-Five is set to 128 while a batch size of 16 is utilized in the training procedure of the other two datasets, thus the dimension of feature map during training on Digit-Five is 128×2048, and 16×4096 for Office-31, and 16×2048 for DomainNet; as for the training epochs, 100 epochs of training are done on both Digit-Five and Office-31, and due to the large amount of data in DomainNet, the model is only trained for 20 epochs.

Step 3: Calculating partial feature alignment losses and selecting partial features from raw features.

Compute the absolute difference $\Delta_i = |f_{S_i} - f_T|$ between the feature maps of the source domains and the target domain, and utilize the difference as the input of the feature selection module, whose output is the feature selection vector $v_i$; then compute the refined feature map of the source domains by $F_{S_i} = f_{S_i} \cdot v_i$; for the target domain, the average value $\bar{v}$ of the feature selection vectors of the source domains is regarded as the selection vector, and the refined feature map for the target domain is represented as $F_T$.

Conduct the partial feature alignment loss $L_p$ for the partial feature selection module on top of $F_{S_i}$ and $F_T$, which is defined as follows:

$$L_p = \frac{1}{N_S}\sum_{i=1}^{N_S} \left\|\mathbb{E}(F_{S_i}^k) - \mathbb{E}(F_T^k)\right\|_2 + \binom{N}{2}^{-1}\sum_{i=1}^{N_S-1}\sum_{j=i+1}^{N_S} \left\|\mathbb{E}(F_{S_i}^k) - \mathbb{E}(F_{S_j}^k)\right\|_2 + \lambda_{reg}\sum(1-\overline{v})^2,$$

where k stands for the order of the moment; $\lambda_{reg}$ is the weight parameter for regularization; $N_S$ is the number of the source domains;

$$\binom{N_S}{2} = \frac{N_S(N_S-1)}{2}$$

is the combinatorial number and $$\binom{N_S}{2}^{-1}$$

is its reciprocal; $\mathbb{E}(*)$ represents the calculation of expected value.

To further conduct partial feature alignment losses, the centroids of each category and each domain on the refined feature map are required, which are maintained in the following manner:

$$f_{i_c}^1 = \frac{1}{n_c}\sum F_{S_{i_c}}^1$$

$$f_{i_c}^b = \beta_c f_{i_c}^{b-1} + (1-\beta_c)\frac{1}{n_c}\sum F_{S_{i_c}}^b,$$

where $f_{i_c}^b$ and $F_{S_{i_c}}^b$ represent the maintained centroid and refined features of class c in the source domain i during batch b, respectively; $\beta_c$ is the trade-off parameter between the accumulated value and the new value of the class centroids.

On top of the centroids, the intra-class, inter-domain, and inter-class partial feature alignment losses are calculated.

Referring to FIG. 3, the intra-class partial feature alignment loss is as follows:

$$L_c = \sum_i \sum_c \left\|\mathbb{E}((F_{i_c}^b)^k) - \mathbb{E}((F_{S_{i_c}}^b)^k)\right\| + \sum_c \left\|\mathbb{E}((F_{T_c}^b)^k) - \mathbb{E}((F_{T_c}^b)^k)\right\|;$$

where k represents the order of the high-order moment; $f_{T_c}^b$ and $F_{T_c}^b$ represent the centroid and the refined features of class c in the target domain during batch b, respectively; the loss is calculated on both source domains and the target domain, while the pseudo labels generated from the classifier are regarded as the target class labels.

The definition of the inter-domain partial feature alignment loss is as follows:

$$L_{dom} = \sum_i \sum_c (f_{T_c}^b - f_{i_c}^b)^2,$$

where $f_{T_c}^b$ and $f_{i_c}^b$ represent the centroids of class c of the target domain and the source domain i, respectively; only the distances between the class centroids of the target domain and the dedicated class centroids of different source domains are calculated in this period.

The inter-class partial feature alignment loss is:

$$L_{disc} = \sum_i \sum_j \left(B - \left\| f_{T_i}^b - f_{T_j}^b \right\| \right)^2,$$

where $f_{T_i}^b$ and $f_{T_j}^b$ represent the centroids of class i and class j of the target domain, respectively; the loss is only calculated for the target domain; firstly calculate the Euclidean distance between each pair of class centroids and then calculate the $L_2$ distance between the Euclidean distance and the pre-defined bias parameter B.

Derive the classification probabilities from the two classifiers utilizing the refined feature maps as the input; calculate the cross-entropy loss $L_s$ for each source domain and conduct the overall loss function through the weighted combination of previously stated loss functions:

$$L = L_s + \lambda_p L_p + \lambda_c L_c + \lambda_{dom} L_{dom} + \lambda_{disc} L_{disc},$$

where $L_s$ is conducted with the sum of the cross-entropy losses of the two classifiers; $\lambda_p$, $\lambda_c$, $\lambda_{dom}$, $\lambda_{disc}$ are pre-defined weight parameters for $L_p$, $L_c$, $L_{dom}$, $L_{disc}$, respectively; update the parameters of all of the modules of the multi-source domain adaptation model by partial feature alignment with the loss function L, including the general feature extraction module, the feature selection module for partial feature extraction, and two adversarial training classifiers.

Step 4: Training the general feature extraction module and the two classifiers in an adversarial manner.

Repeat Step 2 and Step 3 to derive the refined feature maps of the source domains and the target domain without calculating the dedicated feature alignment losses; on the refined feature map, the two classifiers generate target predictions independently and the absolute difference of the predictions is used to calculate $L_{dis}$ after a softmax activation, while the cross-entropy loss $L_s$ is also calculated for the two predictions; fix the parameters of the general feature extraction module, and update the two classifies using $L_s - L_{dis}$ as the loss function to increase the discrepancy of the target predictions; then fix the parameters of the two classifiers and re-compute $L_{dis}$ as the loss function to update the feature extraction module, aiming to reduce the classification discrepancy, which contributes to the adversarial training between the feature extraction module and the two classifiers; specifically, for the general feature extraction module, the procedure of calculating $L_{dis}$ and updating the parameters repeats four times; the number of repeats is a trade-off between the general feature extractor and the two classifiers.

Step 5: Predicting on the validation set.

The model proposed by the disclosure is trained following Step 2-4, on the three datasets in Step 1, and tested on the dedicated validation set. The experimental results demonstrate that the average classification accuracies of the proposed multi-source domain adaptation model by aligning partial features in the disclosure are 92.7%, 84.6%, and 48%, on Digit-Five, Office-31, and DomainNet, respectively, which outperform current multi-source domain adaptation methods on Digit-Five and DomainNet and achieve state-of-the-art on Office-31, indicating that the model proposed by the disclosure can effectively select highly-related partial features of the source domains and the target domain on the raw feature map, and can cluster the samples from identical categories and isolate data points that belong to different classes on the refined feature map through the intra-class, inter-domain, and inter-class partial feature alignment losses.

To further investigate the effectiveness of each module and loss of the model proposed by the disclosure, an ablation study is conducted on Digit-Five dataset, which demonstrates that by removing the feature selection module for partial feature extraction, the classification accuracy drops to 90.9%, by removing the intra-class partial feature alignment loss, the classification accuracy drops to 90.8%, by removing the inter-domain partial feature alignment loss, the accuracy drops to 89.4%, and after the removal of the inter-class partial feature alignment loss, the accuracy is 90.8%. It can be witnessed that different degrees of performance drops are reported by removing different modules of the model proposed by the disclosure, indicating the effectiveness of the improvements made by the feature selection module for partial feature extraction and the three partial feature alignment loss functions in the disclosure that focus on tackling the drawbacks of current multi-source domain adaptation approaches that utilize the entire feature map to forcefully align the features.

It will be obvious to those skilled in the art that changes and modifications may be made, and therefore, the aim in the appended claims is to cover all such changes and modifications.

What is claimed is:

1. A multi-source domain adaptation model by aligning partial features of different domains, comprising:
    a general feature extraction module;
    a feature selection module for partial feature extraction and a corresponding objective function thereof;
    three partial feature alignment losses, the three partial feature alignment losses comprising an intra-class partial feature alignment loss, an inter-domain partial feature alignment loss, and an inter-class partial feature alignment loss; and
    two classifiers for adversarial training;
wherein:
    the general feature extraction module is configured to acquire raw feature maps through conventional convolutional neural networks (CNN) and residual neural networks ResNet-101; the raw feature maps are an output of the general feature extraction module for simple and complicated images;
    $L_1$ distances between the raw feature maps of different pairs of the source domain and target domain are used as inputs of the feature selection module for partial feature extraction; the convolutional neural networks comprise three convolutional layers and two fully connected layers, and a dimension of a last layer of the networks is 2048; the residual neural networks utilize ResNet-101, with a last classification layer removed, to obtain feature maps of 2048 output dimensions of the residual neural networks;
    the feature selection module for partial feature extraction is built with two fully connected layers and utilizes the $L_1$ distances as an input to analyze highly-related feature dimensions between source domains and target domains; an output of the feature selection module is a feature selection vector for an original feature map, which is applied to the original feature map to conduct a refined feature map through dot product;

on the refined feature map, a loss function of the feature selection module for partial feature extraction, the intra-class partial feature alignment loss, the inter-domain partial feature alignment loss, and the inter-class partial feature alignment loss are calculated, respectively, and a weighted combination of the loss functions and a classification loss is used as an overall loss function;

the loss function of the feature selection module for partial feature extraction is:

$$L_p = \frac{1}{N_S} \sum_{i=1}^{N_S} \left\| \mathbb{E}(F_{S_i}^k) - \mathbb{E}(F_T^k) \right\|_2 + \binom{N_S}{2}^{-1} \sum_{i=1}^{N_S-1} \sum_{j=i+1}^{N_S} \left\| \mathbb{E}(F_{S_i}^k) - \mathbb{E}(F_{S_j}^k) \right\|_2 + \lambda_{reg} \sum (1-v)^2,$$

where $F_{S_i} = G(\mathcal{D}_{S_i}) \cdot v_i$ and $F_T = G(\mathcal{D}_T) \cdot \bar{v}$ represent refined features of the source domains and the target domains, respectively, and k is an order of a high-order moment distance; $\lambda_{reg}$ is a weight parameter for regularization; $N_S$ is a number of domains;

$$\binom{N_S}{2} = \frac{N_S(N_S-1)}{2}$$

is a combinatorial number, and $$\binom{N_S}{2}^{-1}$$

is it's reciprocal; $v_i$ stands for a feature selection vector for source domain i and $\bar{v}$ is an average over the feature selection vectors of each source domain; $\mathcal{D}_{S_i}$ represents a batch of sample from a source domain i, and $\mathcal{D}_T$ represents a batch of sample from the target domain;

$\mathbb{E}(*)$ represents the calculation of an expected value; G stands for a general feature extractor; $G(\mathcal{D}_{S_i})$ is the raw feature map extracted from the source domain i, and $G(\mathcal{D}_T)$ is the raw feature map extracted from the target domain;

the three partial alignment loss functions are calculated on top of class centroids on the refined feature map, which is defined as follows:

$$f_{i_c} = \frac{1}{n_c} \sum F_{S_{i_c}},$$

where $f_{i_c}$ represents a centroid of class c in the source domain i;

$$F_{S_{i_c}}$$

stands for refined features of samples that belong to class c from the source domain i, and $n_c$ represents a number of samples in a training batch;

a class centroid of the target domain is defined as follows:

$$f_{T_c} = \frac{1}{n_c} \sum F_{T_c},$$

where $f_{T_c}$ represents a centroid of class c in the target domain; $F_{T_c}$ stands for the refined features of samples that belong to class c from the target domain, and $n_c$ represents the number of samples in the training batch;

to preserve information gained from previous training batches of the multi-source domain adaptation model by aligning partial features, an exponential moving average is utilized to update all of the centroids during each batch:

$$f_{i_c}^b = \beta_c f_{i_c}^{b-1} + (1-\beta_c) \frac{1}{n_c} \sum F_{S_{i_c}}^b,$$

where $\beta_c$ is a weight parameter for previously calculated centroids; $f_{i_c}^b$ and $$F_{S_{i_c}}^b$$

represent a maintained centroid and refined features of class c in the source domain i during batch b, respectively; the calculations of target centroids $f_{T_c}^b$ are the same as that of $f_{i_c}^b$;

the intra-class partial feature alignment loss is:

$$L_c = \sum_i \sum_c \left\| \mathbb{E}((F_{i_c}^b)^k) - \mathbb{E}((F_{S_{i_c}}^b)^k) \right\| + \sum_c \left\| \mathbb{E}((F_{T_c}^b)^k) - \mathbb{E}((F_{T_c}^b)^k) \right\|;$$

where k stands for an order of high-order moment;
the inter-domain partial feature alignment loss is:

$$L_{dom} = \sum_i \sum_c (f_{T_c}^b - f_{i_c}^b)^2,$$

where $f_{T_c}^b$ and $f_{i_c}^b$ represent the above-mentioned centroids of class c of the target domain and the source domain i, respectively;

the inter-class partial feature alignment loss is:

$$L_{disc} = \sum_i \sum_j (B - \| f_{T_i}^b - f_{T_j}^b \|)^2,$$

where $f_{T_i}^b$ and $f_{T_j}^b$ represent the centroids of class i and class j of the target domain, respectively; B is a bias hyper-parameter set for restricting the degree of discreteness of different class centroids on the feature map of the target domain;

an overall loss function for the multi-source domain adaptation model by aligning partial features is:

$$L = L_s + \lambda_p L_p + \lambda_c L_c + \lambda_{dom} L_{dom} + \lambda_{disc} L_{disc},$$

where $L_s$ is a classification cross-entropy loss for source domains, which is a sum of the cross-entropy losses of two classifiers during adversarial training; $\lambda_p$, $\lambda_c$, $\lambda_{dom}$, $\lambda_{disc}$ are pre-defined weight parameters for $L_p$, $L_c$, $L_{dom}$, $L_{disc}$, respectively.

2. A method for multi-source domain adaptation by aligning partial features using the multi-source domain adaptation model by aligning partial features of claim 1, the method comprising:

Step 1: preprocessing data, selecting three open datasets comprising Digit-Five, Office-31, and DomainNet for experiments;

where, Digit-Five collects subsets of five different types of hand-written digit classification datasets, which are MNISTM-M, MNIST, USPS, SVHN, and Synthetic Digits; USPS contains 9298 images and other datasets each contains 25000 images for training and 9000 images for validation;

Office-31 is a conventional multi-source domain adaptation dataset comprising 4652 images in 31 different categories that are collected from an office environment and are presented in three domains: Amazon, Webcam, and DSLR;

DomainNet contains six domains of data: clipart, infograph, painting, quickdraw, real, and sketch, and each domain contains 345 categories of images;

the data preparation process comprises image resizing, random clip, and random crop;

Step 2: extracting raw features from processed data using the general feature extraction module; where, for the Digit-Five dataset, the images are resized to 32×32, and the general feature extraction module is constructed with three convolutional layers and two fully connected layers, where a convolution kernel size is 5 and the output of the fully connected layers is a feature vector with 2048 dimensions; for the Office-31 dataset, the images are resized to 252×252, and the general feature extraction module is AlexNet pre-trained on ImageNet, and outputs a feature vector with 4096 dimensions; for the DomainNet dataset, the image size is 224×224 and the pre-trained ResNet-101 is utilized as the general feature extractor, and outputs a 2048-dimension feature vector; $f_{S_i}$ and $f_T$ represent the feature map of the source domain i and that of the target domain, respectively;

during training, a batch size of Digit-Five is set to 128 and a batch size of 16 is utilized in the training procedure of the other two datasets, thus the dimension of feature map during training on Digit-Five is 128×2048, and 16×4096 for Office-31, and 16×2048 for DomainNet; as for the training epochs, 100 epochs of training are done on both Digit-Five and Office-31, and due to the large amount of data in DomainNet, the model is only trained for 20 epochs;

Step 3: calculating partial feature alignment losses and selecting partial features from raw features; computing an absolute difference $\Delta_i = |f_{S_i} - f_T|$ between the feature maps of the source domains and the target domain, and utilizing the difference as the input of the feature selection module, and an output thereof is a feature selection vector $v_i$; computing the refined feature map of the source domains by $F_{S_i} = f_{S_i} \cdot v_i$; where, for the target domain, an average vector $\bar{v}$ over the feature selection vectors of the source domains is regarded as the selection vector, and the refined feature map for the target domain is represented as $F_T$;

conducting the partial feature alignment loss $L_p$ for the partial feature selection module on top of $F_{S_i}$ and $F_T$, which is defined as follows:

$$L_p = \frac{1}{N_S}\sum_{i=1}^{N_S} \left\|\mathbb{E}(F_{S_i}^k) - \mathbb{E}(F_T^k)\right\|_2 +$$

-continued
$$\binom{N}{2}^{-1}\sum_{i=1}^{N_S-1}\sum_{j=i+1}^{N_S}\left\|\mathbb{E}(F_{S_i}^k) - \mathbb{E}(F_{S_j}^k)\right\|_2 + \lambda_{reg}\sum(1-\overline{v})^2,$$

where k stands for the order of the moment; $\lambda_{reg}$ is the weight parameter for regularization; $N_S$ is the number of the source domains;

$$\binom{N_S}{2} = \frac{N_S(N_s - 1)}{2}$$

is the combinatorial number and $$\binom{N_S}{2}^{-1}$$

is its reciprocal; $\mathbb{E}(*)$ represents the calculation of an expected value;

to further conduct partial feature alignment losses, maintaining the centroids of each category and each domain on the refined feature map as follows:

$$f_{i_c}^1 = \frac{1}{n_c}\sum_{b-1}F_{S_{i_c}}^1$$

$$f_{i_c}^b = \beta_c f_{i_c}^{b-1} + (1-\beta_c)\frac{1}{n_c}\sum F_{S_{i_c}}^b,$$

where $$f_{i_c}^b \text{ and } F_{S_{i_c}}^b$$

represent the maintained centroid and refined features of class c in the source domain i during batch b, respectively; $\beta_c$ is a trade-off parameter between the accumulated value and a new value of the class centroids;

on top of the centroids, calculating the intra-class, inter-domain, and inter-class partial feature alignment losses; the intra-class partial feature alignment loss is as follows:

$$L_c = \sum_i\sum_c\left\|\mathbb{E}((F_{i_c}^b)^k) - \mathbb{E}((F_{S_{i_c}}^b)^k)\right\| + \sum_c\left\|\mathbb{E}((F_{T_c}^b)^k) - \mathbb{E}((F_{T_c}^b)^k)\right\|;$$

where k represents the order of the high-order moment; $f_{T_c}^b$ and $F_{T_c}^b$ represent the centroid and the refined features of class c in the target domain during batch b; the loss is calculated on both source domains and the target domain, and pseudo labels generated from the classifier are regarded as target class labels;

the inter-domain partial feature alignment loss is as follows:

$$L_{dom} = \sum_i\sum_c(f_{T_c}^b - f_{i_c}^b)^2,$$

where $f_{T_c}^b$ and $f_{i_c}^b$ represent the centroids of class c of the target domain and the source domain i, respectively;

only the distances between the class centroids of the target domain and the dedicated class centroids of different source domains are calculated in this period; the inter-class partial feature alignment loss is:

$$L_{disc} = \sum_i \sum_j \left(B - \left\| f_{T_i}^b - f_{T_j}^b \right\| \right)^2,$$

where $f_{T_i}^b$ and $f_{T_j}^b$ represent the centroids of class i and class j of the target domain, respectively; the inter-class partial feature alignment loss is only calculated for the target domain; an Euclidean distance between each pair of class centroids is first calculated and then the $L_2$ distance between the Euclidean distance and a pre-defined bias parameter B is calculated;

deriving classification probabilities from the two classifiers utilizing the refined feature maps as the input for adversarial training; calculating the cross-entropy loss $L_s$ for each source domain and conducting the overall loss function through a weighted combination of the loss functions:

$$L = L_s + \lambda_p L_p + \lambda_c L_c + \lambda_{dom} L_{dom} + \lambda_{disc} L_{disc},$$

where $L_s$ is conducted with the sum of cross-entropy losses of the two adversarial training classifiers; $\lambda_p$, $\lambda_c$, $\lambda_{dom}$, $L_{disc}$ are pre-defined weight parameters for $L_p$, $L_c$, $L_{dom}$, $L_{disc}$, respectively; the parameters of all of the modules of the multi-source domain adaptation model by aligning partial features are updated with the loss function L, the modules comprising the general feature extraction module, the feature selection module for partial feature extraction, and two adversarial training classifiers;

Step 4: training the general feature extraction module and the two classifiers in an adversarial manner; repeating Step 2 and Step 3, to derive the refined feature maps of the source domains and the target domain without calculating the dedicated feature alignment losses; on the refined feature map, generating, by the two classifiers, target predictions independently, calculating the absolute difference $L_{dis}$ of the predictions after a softmax activation, and the cross-entropy loss $L_s$ for the two predictions; fixing the parameters of the general feature extraction module, and updating the two classifies using $L_s - L_{dis}$ as the loss function to increase the discrepancy of the target predictions; fixing the parameters of the two classifiers and re-compute $L_{dis}$ as the loss function to update the feature extraction module, aiming to reduce the classification discrepancy, which contributes to the adversarial training between the feature extraction module and the two classifiers; for the general feature extraction module, repeating calculating $L_{dis}$ and updating the parameters for four times, where the number of repeats is a trade-off between the general feature extractor and the two classifiers; and Step 5: predicting on a validation set; training, by the multi-source domain adaptation model by aligning partial features, the three open datasets in Step 1 following operations from Step 2 to Step 4, and testing the validation set.

\* \* \* \* \*